United States Patent
Zhang et al.

(10) Patent No.: US 11,838,850 B2
(45) Date of Patent: Dec. 5, 2023

(54) METHOD FOR ADDING REDUNDANT RELAY NODES DURING PATH DISCOVERY PROCEDURE OF A MESH NETWORK

(71) Applicant: Telefonaktiebolaget LM Ericsson (publ), Stockholm (SE)

(72) Inventors: Jingcheng Zhang, Svärtinge (SE); Thomas Rimhagen, Linköping (SE); Piergiuseppe Di Marco, Teramo (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 353 days.

(21) Appl. No.: 17/276,471

(22) PCT Filed: Sep. 20, 2019

(86) PCT No.: PCT/EP2019/075332
§ 371 (c)(1),
(2) Date: Mar. 15, 2021

(87) PCT Pub. No.: WO2020/058476
PCT Pub. Date: Mar. 26, 2020

(65) Prior Publication Data
US 2022/0046515 A1    Feb. 10, 2022

Related U.S. Application Data

(60) Provisional application No. 62/734,521, filed on Sep. 21, 2018.

(51) Int. Cl.
*H04W 40/30* (2009.01)
*H04W 24/04* (2009.01)
*H04W 40/22* (2009.01)
*H04W 84/18* (2009.01)

(52) U.S. Cl.
CPC .......... *H04W 40/30* (2013.01); *H04W 24/04* (2013.01); *H04W 40/22* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 2008/0095059 A1* | 4/2008 | Chu | H04L 12/66 370/238 |
| 2016/0373997 A1* | 12/2016 | Petersen | H04W 72/20 |
| 2017/0142004 A1* | 5/2017 | Åström | H04W 40/246 |
| 2018/0176119 A1 | 6/2018 | Abdallah et al. | |

FOREIGN PATENT DOCUMENTS

WO    2020035159 A1    2/2020

OTHER PUBLICATIONS

PCT International Search Report, dated Nov. 18, 2019, in connection with International Application No. PCT/EP2019/075332, all pages.
PCT Written Opinion, dated Nov. 18, 2019, in connection with International Application No. PCT/EP2019/075332, all pages.

(Continued)

Primary Examiner — Brian S Roberts
(74) Attorney, Agent, or Firm — LEFFLER INTELLECTUAL PROPERTY LAW, PLLC

(57) ABSTRACT

A method and apparatus for device establishing redundant relay nodes in a mesh network.

14 Claims, 21 Drawing Sheets

(56) References Cited

OTHER PUBLICATIONS

Chen, Ching-Wen, "A Bandwidth-Based Routing Protocol with Efficient Path Discovery in Mobile Ad Hoc Networks", 2009 10th International Symposium on Pervasive Systems, Algorithms, and Networks, IEEE, Piscataway, NJ, USA, Dec. 14, 2009, pp. 214-219.
Wang, Q., et al., "A Robust Routing Protocol For Wireless Mobile Ad Hod Networks", Communication Systems, 2002, ICCS 2002, The 8th International Conference on Nov. 25-28, 2002, Piscataway, NJ, USA, IEEE, vol. 2, pp. 1071-1075.
Kim, Sangkyung, et al., "Multi-path Ad Hoc Routing Considering Path Redundancy", Proceedings of the Eighth IEEE International Symposium on Computers and Communication (ISCC '03), Jun. 30-Jul. 3, 2003, Piscataway, NJ, USA, Jan. 1, 2003, pp. 45-50.
Ling, Hui et al., "Coverage-based Probabilistic Forwarding in Ad Hoc Routing", Proceedings of 14th International Conference on Computer Communications and Networks, 2005, ICCCn 2005, San Diego, CA, USA Oct. 17-19, 2005, Piscataway, NJ, USA, Oct. 17, 2001, pp. 13-18.
European Communication dated Jun. 9, 2023 in connection with European Application No. 19778899.5, 8 pages.

* cited by examiner

| Field | Size (octets) | Notes |
| --- | --- | --- |
| OPT | 1 | Options |
| PD | 2 | Path Destination |
| PO | 2 | Path Originator or Delegate Path Originator |
| OFN | 1 | Originator Forwarding Number generated by the Path Originator or the Delegate Path Originator |
| OPM | variable | Originator Path Metric associated with the path to the Path Originator or the path to the Delegate Path Originator |
| DPD (optional) | 2 | Delegate Path Destination |
| DAR (optional) | 1 | Destination Address Range |
| SNA (optional) | 2 | Selected Node Address (the Primary network address of the selected relay node for the path). |
| RRA (optional) | 2*n | Redundant Relay Addresses (a list of the primary network addresses of redundant relay node(s)). |

Figure 10 Table 1a

| Field | Size (bits) | Notes |
|---|---|---|
| OBOD | 1 | On Behalf Of Destination flag |
| OBOO | 1 | On Behalf Of Originator flag |
| EA | 1 | Extended Address flag |
| CRQ | 1 | Confirmation Requested flag |
| RNE | 1 | Redundant node feature enabled |
| RFU | 3 | Reserved for future use |

Figure 11 Table 1b

| Field | Size (octets) | Notes |
|---|---|---|
| Status | 1 | Status indicate if the node accepts to be a redundant relay node or not. |
| OBOO | 1 | If set to 1, PO is set using the DPO address. otherwise, PO is set using the PO address of the received EPREP message. |
| PD | 2 | Path Destination |
| PO | 2 | Path Originator or Delegate Path Originator |
| FN | 1 | Originator Forwarding Number generated by the Path Originator or the Delegate Path Originator |

Figure 12 Table 2

METHOD FOR ADDING REDUNDANT RELAY NODES DURING PATH DISCOVERY PROCEDURE OF A MESH NETWORK

TECHNICAL FIELD

Embodiments presented herein relate to a device, a method therein, a controller, a computer program, and a computer program product. Specifically, they relate to improving the success rate of transmitting messages on paths/routes created and maintained by routing algorithms in a mesh network, by assigning redundant relay nodes.

BACKGROUND

Mesh networking is a key architecture for Internet of Things (IoT). In this network topology all nodes/devices can communicate with each other; either through direct message exchange or via intermediate nodes that help forward the message from source to destination. This is often more cost effective and easier to implement than having to use additional gateway devices or access points which often need additional equipment and more extensive planning.

Below follows an introduction on some terminology that is commonly used in this and related fields.

An ad hoc network is put together for a specific purpose and is often, but not always, of a temporary nature. (Ad hoc is Latin and means "for this purpose".) Ad hoc network sometimes refers to any set of networks where the nodes/devices have equal status in the network and are free to associate and/or communicate with any other node/device. Sometimes these nodes/devices are referred to as ad hoc nodes/devices.

A wireless ad hoc network is a decentralized type of wireless network were the nodes/devices communicates wirelessly. Sometimes these nodes/devices are referred to as wireless nodes/devices or wireless ad hoc nodes/devices.

The network is referred to as ad hoc because it does not rely on a preexisting infrastructure, such as base stations, access points or routers, which are normally present in managed (comprising infrastructure) wireless networks like mobile telephony networks. Instead, each node/device participates in routing by forwarding/relaying data for other nodes/devices. The determination of which nodes/devices should forward data to which other nodes/devices is made dynamically based on network connectivity.

A MANET (mobile ad hoc network) is a self-configuring infrastructure-less network of nodes/devices that are mobile and wirelessly connected. Sometimes these nodes/devices are referred to as mobile nodes/devices, wireless nodes/devices or mobile ad hoc nodes/devices. A MANET is a kind of wireless ad hoc network, but a MANET also specifically has to deal with the problems introduced by the mobility of the nodes/devices. Each node/device in a MANET is free to move independently in any direction and will therefore change its links to other devices frequently. Each device must forward traffic unrelated to its own use, and therefore act as a router. The primary challenge in building a MANET is equipping each device to continuously maintain the information required to properly route traffic. Such networks may operate by themselves or may be connected to the larger Internet.

A mesh network is a network topology in which all nodes/devices cooperate in the distribution of data, typically by each node/device forwarding/relaying data for the network. The nodes/devices in a mesh network are sometimes referred to as mesh nodes/devices.

A mesh network whose nodes/devices are all connected directly to each other is usually referred to as a fully connected mesh network. In this topology it is not necessary to use forwarding/relaying, unless for purposes like redundancy and/or load traffic load distribution.

In a partially connected mesh network, one or more nodes/devices are not connected directly to all other nodes/devices. In a partially connected mesh network forwarding/relaying of messages is necessary in order to allow all nodes/devices to reach all other nodes/devices. This is a very common network topology when the nodes/devices are wirelessly connected.

Ad hoc networks, wireless ad hoc networks and MANETs often use a mesh network topology. The nodes/devices in a mesh network does not necessarily have to be neither mobile nor wirelessly connected. Although the mesh network topology is mostly used in wireless situations, the concept is also applicable to wired networks and software interaction.

The network types, and topology, mentioned above can be designed using a routing technique or a flooding technique. Any of those techniques can incorporate multipath routing. Multipath routing is the routing technique of using multiple alternative paths through a network, which can yield a variety of benefits such as fault tolerance, increased bandwidth, or improved security. Multipath routing can also be referred to as path redundancy and path diversity.

When using a routing technique, a packet/message is propagated along a path, by hopping from node/device to node/device until the destination is reached. This is done by the having the intermediate nodes relaying/forwarding the packet/message. To ensure all its paths' availability, a mesh network must allow for continuous connections and reconfiguration around broken or blocked paths, using self-healing algorithms.

In addition to a classic routing technique, the network types can use a flooding technique for forwarding data. Flooding technique in wired networks is usually simple algorithm where every incoming packet/message is sent on every outgoing link except the one it arrived on (when having multiple links). In wirelessly connected networks, it is typically implemented by each node/device simply retransmitting (forwarding/relaying) all incoming packets/messages that are not intended for the node/device itself, in order to relay them to other nodes/devices.

A brief comparison of the two techniques using their most basic or fundamental implementations would be:

A routing technique
- generates less network traffic caused by data transmissions, since the data traffic is sent only via nodes/devices on the paths/routes that will lead to the destination nodes/devices.
- generates network traffic caused by control messages and protocols setting up routes and paths and performing related tasks.
- is quite reliable, since
  - the self-healing capabilities allow the network to continue to operate when a node/device breaks down or a connection goes bad.
  - A multipath routing technique is sometimes implemented. This will lead to improved behavior due to redundancy.

A flooding technique
- generates more network traffic caused by the data transmissions, since the data traffic is usually forwarded/relayed by all devices in the network.
- generates no, or less, network traffic caused by control messages or protocols to set up routes or paths, simply since these mechanisms are not used, at least not to the same extent and with the same meaning as in a network using a routing technique.

is simple and robust as there is no need to find and setup any explicit route/path between a source node/device and a destination node/device, and messages/packets may traverse from the source node/device to the destination node/device over multiple paths/routes, providing inherent diversity against, node/device failures or bad communication.

The terminology in this field is not totally uniquely defined, people sometimes use different terminology for the same thing, or the same terminology for different things.

For the purpose of simplicity, we will use the term mesh network to denote any of the above listed network types (ad-hoc network, wireless ad hoc network and MANET) as well as any network having a mesh network topology, be it wireless or wired, with mobile or stationary nodes/devices.

In the same way we will use the terms device and node interchangeably, to denote an ad-hoc node/device, a wireless node/device, an ad-hoc wireless device, a mobile node/device, a mobile ad hoc node/device, a mesh node/device as well as other names used for devices participating in the networks mentioned above.

The term device includes devices that are only intended for or capable of participating in mesh networks, as well as devices that are intended for, or capable of, participating also in another network, as for example a mobile communications network. When it comes to the latter type of devices, one or more of the devices, or even all devices, could be simultaneously participating in the mesh network and another network. Further, a device that is designed for, or capable of, participating in another network but that for the moment is not, could temporarily or permanently have lost contact with, or for other reasons have chosen, or been ordered, not to operate in, the mobile communications network.

In the same way we will use the terms route and path interchangeably

Please note that the terms device and node in the present context denotes devices such as Machine to Machine (M2M) devices, Internet of things (IoT) devices, Device to Device (D2D) devices, relays, sensors, smartphones, mobile phones, user equipment, modems, laptops, tablet computers, surf plates just to mention some examples.

The devices or nodes in the present context may be, for example, permanently or temporary mounted on equipment (containers, etc.) or a fixed structure (wall, roof, etc.), portable, pocket-storable, hand-held, computer-comprised, wearable and/or vehicle-mounted mobile devices, just to mention a few examples.

In existing mesh communications standards such as IEEE 802.11 Mesh (MAC and PHY layers for WLAN) and IEEE 802.15 (Zigbee) path setup is handled by either proactive or reactive signaling.

Proactive signaling normally use a root node to which all other nodes signal periodically, hence a node always knows the path to root and root always knows the path to all nodes. Proactive signaling establishes paths in advance, meaning before the immediate need arises. The periodic signaling requires significant overhead.

Reactive signaling establishes a path upon request when data is to be transmitted. At that instant the path must be found by broadcast signaling to all other nodes in the network, causing significant overhead and possible broadcast storm problems limiting the practical network size.

Bluetooth Low Energy (BLE) is a wireless personal area network technology designed by the Bluetooth Special Interest Group (SIG) aiming at novel applications in the healthcare, fitness, security, and home automation industries. Compared to Classic Bluetooth, BLE is intended to provide considerably reduced power consumption and cost while maintaining a similar communication range. On the other hand, the amount of data being transmitted by the BLE devices is much less than the classic Bluetooth devices.

Bluetooth mesh network is a newly adopted technology profile by Bluetooth SIG which aims at extending the coverage of the BLE network. The Bluetooth mesh network is a multi-hop network, it uses the BLE advertisement channels for data communication so that the Bluetooth mesh nodes that are within the radio range can communicate directly without establishing the data channel communication.

There are two kinds of message forwarding methods considered in the Bluetooth mesh networks, i.e., the flooding method and the directed forwarding method.

When using the flooding method, all the nodes that can act as relay nodes (also called mesh relays) participate in the message forwarding/relaying.

When using the directed forwarding method, which is a routing technique, a path/route is created between the path originator (PO) and the path destination (PD) node(s). Only nodes that belong to the created path will act as relay nodes (also called mesh relays or routers) and forward the message.

As shown in FIG. 1, there are three advertisement channels defined in the BLE technology, i.e., ch37, ch38 and ch39.

A Bluetooth mesh message is transmitted at all three advertisement channels within one advertisement event. There is no link layer acknowledgement mechanism defined in the mesh communication. Sometimes, the same message is retransmitted multiple times using multiple advertisement events. A Bluetooth mesh relay is a device whose radio receiver is always on. A Bluetooth mesh relay scans one advertisement channel at a time. The relay sequentially scans all the three advertisement channels.

In the up-coming Bluetooth mesh network, the directed forwarding enabled mesh relays create paths between the path originator (PO) devices and the path destination (PD) device(s). Once a message is forwarded using directed forwarding, it is only forwarded by the relays which are included in the path established from the PO to the PD. Other nodes do not forward this message. The algorithm for path creation is a distance vector-based algorithm, FIG. 2*a* and FIG. 2*b* shows a general description of this algorithm.

As shown in FIG. 2*a*, device A, which is the PO, starts the path discovery procedure by sending a path request message (PREQ), intended for device B, which is the PD, through the whole network.

The PREQ is a single-hop broadcast message. Any node that receives this message will generate and send a new PREQ which uses its own device address as the new PREQ network source address. The PREQ message propagation continues until the PREQ is received by device B which is the PD.

FIG. 2*b* shows the final part of the path establishment procedure between device A, which is PO and device B, which is PD.

When device B, which is the PD, receives the PREQ messages, it selects the "best" relay to establish the path. Device B sends a unicast path reply message (PREP) to the selected relay node. Once the selected relay node receives the RREP message, it repeats the same procedure, generates and sends new PREP until the PREP reaches node A which is the PO.

Before device B sends PREP to device N, it has received PREQs from devices Q, N and X. Two algorithms are defined for relay node selection in the specification, one hop-count metric with random path selection and one hop-count metric with average-RSSI-based path selection. As defined in the first algorithm, the relay that sends the PREQ using the minimum hop count is selected as the best relay, in case there are more than one relay that sends PREQ with the same hop count, the next-hop relay node is randomly selected. In the second algorithm, the relay that sends the PREQ with minimum hop count and have the highest average RSSI is selected as the next-hop relay node.

The path information is saved by each individual relay locally in the so called forwarding table. In the forwarding table, each path is uniquely identified using:

PO: The network address of the path originator.
OFN: Originator forwarding number, the sequence number of the path request session.

Additionally, the same entry in the forwarding table also contains the following fields:

PD: The network address of the path destination.
Subscription list: The groupcast address list that needs to be supported by the current path.
NTO: The network address of the node toward the path originator. In FIG. 2b, for relay N,
NTD: The network address of the node toward the path destination. In FIG. 2b, for relay M, the NTD is the network address of device N.

The nodes in the mesh network utilizes the forwarding table for making decisions on whether to relay messages or not. Once a directed forwarding application-message is received by a relay, the SRC and DST field of the message is checked against the forwarding table. If the message is a unicast message, the PO and PD fields of the forwarding table are checked. If match found, the message is forwarded by the relay. Otherwise, the message is dropped. If the message is a multicast message, the SRC and DST field of the received message is checked against the PO and the subscription list field of each entry of the forwarding table. In case of a match, the received message is forwarded by the relay, otherwise, the message is dropped.

Both path creation algorithms defined in the specification are hop-count based which creates the path that uses the minimum number of hops between the PO and PD. FIG. 3 shows one simple example when PO, device A, wants to create a path to PD, device B. B receives two PREQ messages sent from N and Q.

The hop count contained in the PREQ from N is 3 (A→M, M→N, N→B) and the hop-count of the PREQ sent from Q is 4 (A→E, E→P, P→Q, Q→B). In this case, the path with hop count 3 is selected since it uses less number of hops from PO to reach PD. The path with fewer number of hops also requires less time to transmit the message from PO to PD and generate less number of message transmissions.

This algorithm works fine if the radio link between each hop is reliable. However, in a wireless network, a less hop count usually means a longer distance between some hops. Typically, the longer the distance, the lower the signal strength of the received messages. In this case, the path created by only using hop-count may not be stable enough.

To increase the link reliability for the created path, the neighbour table mechanism is proposed to filter out unreliable radio links. Each device maintains locally a so-called Neighbour Table to keep track of the link quality of its neighbour devices that are within its radio propagation range. If the link strength is above the defined threshold, the link is considered reliable and the peer node is marked as neighbour device, otherwise it is flagged as "no neighbour" but the entry is kept (as the conditions may change). During the path creation procedure, the device only processes the PREQ sent from peer nodes marked as neighbour device. Thus, the node with unreliable link will never be selected.

Directed forwarding also defines a Neighbour Information message (NINFO), which is used by nodes to exchange information proactively with their neighbours and to avoid the need for path discovery for local communication. When enabled, NINFO message transmission is periodic, and it can be used to monitor the status of valid paths (i.e., paths whose information is stored).

The NINFO message can be configured to periodically broadcast its neighbour table information. A node can acquire the neighbour table information for to devices which are three hops away. As shown in FIG. 4, each node can only directly reach the relays directly next to it.

All relays are configured to broadcast its two-hop neighbour information (maximum hop number allowed in the current specification). In this case, RL1 will send NINFO message indicating its neighbour is RL0, RL2 and RL3. Such information is received by RL0 and RL2. RL2 will further broadcast its own NINFO message indicating its 1-hop neighbour is RL1 and RL3 and 2-hop neighbour is RL0. When RL3 receive this message, RL3 already knows a path to RL0.

In Bluetooth mesh network several methods are available to restrict the unlimited relaying of messages. One of the most important is the Time-To-Live (TTL or ttl). With this method, each message/packet includes a TTL value that limits the number of times that a message can be relayed. The message originator sets a suitable initial value for TTL. Each time a message is received and then relayed by a device, the TTL value is decremented by one. When the TTL reaches a lower threshold (e.g., 0 or 1), it will not be forwarded further. In the BLE Mesh specification, TTL=0 is used for single hop communication. Packets received with TTL=0 or TTL=1 will not be relayed.

The BLE Mesh network layer packet includes, among others, a source field, a destination field, and a sequence number. There is, however, no explicit means for the source to control the route of the message/packet.

In a more generalized way Time to live (TTL) or hop limit is a mechanism that limits the lifespan or lifetime of data in a computer or network. TTL may be implemented as a counter or timestamp attached to or embedded in the data. Once the prescribed event count or timespan has elapsed, data is discarded. TTL was originally introduced in computer networking to prevent a data packet from circulating indefinitely.

Application No. 62/719,247 "INDEPENDENT REDUNDANT PATH DISCOVERY FOR BLUETOOTH MESH" provides specific improvements to communication between nodes in a wireless mesh network, such as by providing novel techniques for establishing multiple (or redundant) independent paths between a source node and a destination node via a plurality of intermediate nodes in the mesh network. In this manner, embodiments can increase redundancy and/or reliability (e.g., compared to the existing single-path AODV discovery) when used in mesh networks (e.g., Bluetooth mesh networks), such that the likelihood of successful message delivery towards a destination improves without generating additional interference.

Application No. 62/662,312 "wireless communication apparatus for mesh network, method and computer program" provides a wireless communication apparatus arranged to operate in a mesh network where packets are enabled to be transmitted using a directed forwarding multi-hop approach along a path of wireless devices from an originating wireless device to a destination wireless device. The wireless communication apparatus is arranged to form a directed forwarding assistant request, DFAR, message, and transmit the DFAR message to at least one wireless communication device not belonging to the path. The DFAR message comprises information to the at least one wireless communication device not belonging to the path about the path, including a next hop wireless communication device address of the path, and an indication on requested assistance to forward a data message towards a next hop wireless communication device of the path.

SUMMARY

An object of embodiments herein is to provide a method and apparatus that can be used to improve the message success rate of the paths created and maintained by directed forwarding.

The proposed method will assign redundant relay nodes, based on a modified path discovery procedure in a Bluetooth mesh network, which will help message forwarding through the created path. The redundant relay nodes are assigned locally throughout the path, meaning that each node in the path will assign a selected (or primary) relay node, and optionally one or more redundant (or secondary) relay nodes. The assigning of redundant relay nodes is not coordinated in the way to create a complete separate redundant path. Rather each selected relay node assigns redundant relay nodes to increase the redundancy for the created path.

During the path discovery procedure, instead of sending a unicast PREP, the PD sends a broadcast extended path reply message (EPREP). The PREP is as of today included in the standard, while the EPREP is however a new message (it can also be seen as a modified PREP) introduced in this disclosure. The identity of the selected hop relay node towards the PO is included in the message payload. Here, by a selected node we mean a node on the selected path, typically the best path from PO to PD, as opposed to a redundant path which is used for redundancy reasons. Additionally, the EPREP can include an address list that indicates the nodes that shall be used as redundant relay nodes.

When the EPREP is received by the selected relay node towards the PO, the selected relay node will generate a new EPREP (which is also broadcasted), which will include the next selected relay node towards the PO and may include the address list indicating the new redundant relay nodes used to create the redundant path. This will continue until the PD has been reached.

When a redundant relay node receives this message, it evaluates the feasibility of being a redundant relay node. If the node accepts to be a redundant relay node, it adds a new entry in its local forwarding table. In one embodiment, the redundant relay node sends a notification message to the EPREP sender. However, the redundant relay node does not generate any new EPREP.

This proposal has the following advantages.

The redundant relay nodes are added during the path creation procedure. Using this method, the redundancy of a path is created much faster than other existing solutions.

The redundant relay nodes are "close" to the path created. Thus, the message can be inter-exchange between the selected relay nodes and the redundant relay nodes. This further increase the message delivery rate.

Each relay in the path can select its "own" redundant relay node to participate in the message forwarding, the total number of redundant relay nodes for one path is scalable. For instance, one relay node may choose one redundant relay node while another relay node chose two nodes.

This method can be implemented as an addon of the existing procedures defined in the current directed forwarding specification, it has very little impact of the current specification, but potentially, the gain can be large By creating redundant paths, the message delivery success rate can be increased. This method can create the redundant paths very quickly, using minimum message transmission and the path created is closed tight with the original path. This method is highly scalable

BRIEF DESCRIPTION OF THE DRAWINGS

The inventive concept will be described, by way of example, with reference to the accompanying drawings, in which:

FIG. 10 shows Table 1a. EPREP message format.

FIG. 11 shows Table 1b. The Options field in the EPREP.

FIG. 12 shows Table 2. R2CONF message format.

DETAILED DESCRIPTION

The embodiments describing methods and apparatus are valid for all wireless technologies which has the features and possibilities that are being discussed in this disclosure. For the sake of illustration BLE will be used as a non-limiting example.

As part of developing embodiments herein, some problems of the state of the art will first be identified and discussed.

Message reliability can be low in the single path created by the directed forwarding algorithm. In its basic configuration, directed forwarding selects a single path between an originator and a destination. Due to the intrinsic lossy nature of the wireless links and access methods, of which Bluetooth Mesh medium access methods is an example, and a possibly reduced duty cycle of the receivers, the selection of a single path may not be sufficient to maintain a guaranteed successful reception rate. it is then useful to have redundancy in the number of paths available between an originator-destination pair.

Radio links are not stable and can be easily interfered. As an example, Bluetooth mesh uses the 2.4 GHz ISM band, which is a radio band that is shared with WiFi and ZigBee and other proprietary radio technologies. It is a radio band that is also getting more and more crowded and it is easily interfered also by the environment, e.g., humidity and human activities. In this case, even a strong link might suffer from temporary disturbance just because there are people standing between the two relays. Another example is that a Bluetooth mesh network deployed in an office building can be interfered during the working hours when many people are using WiFi and other radio devices.

The inventive concept will now be described more fully hereinafter with reference to the before mentioned figures, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers and reference symbols refer to like elements throughout the description. Any step or feature illustrated by dashed lines in the flow diagrams should be regarded as optional.

Figure 1:
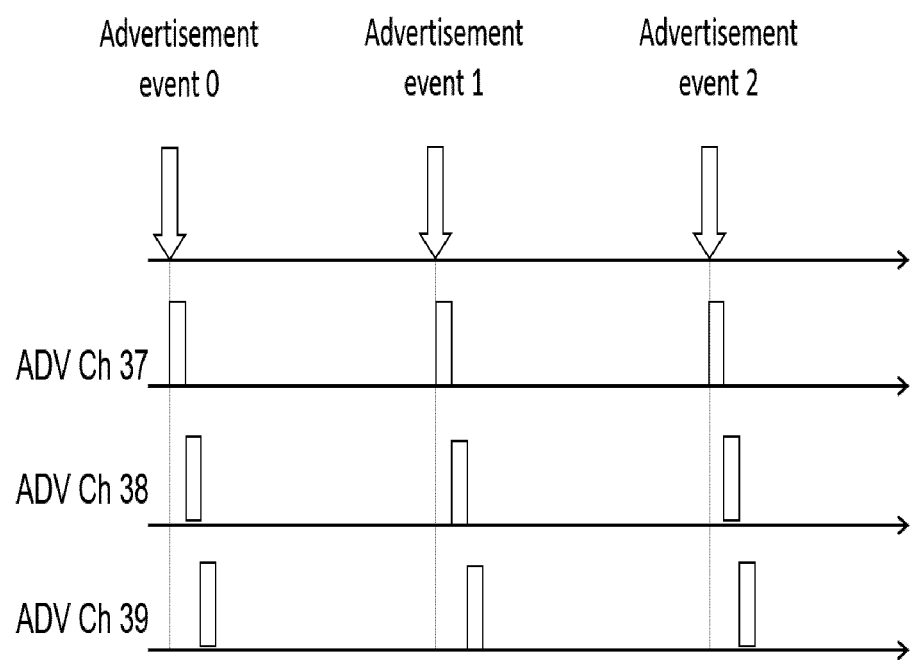
FIG. 1 shows the state of the art mesh message triplet transmissions on three advertisement channels in BLE.
Figure 2A:
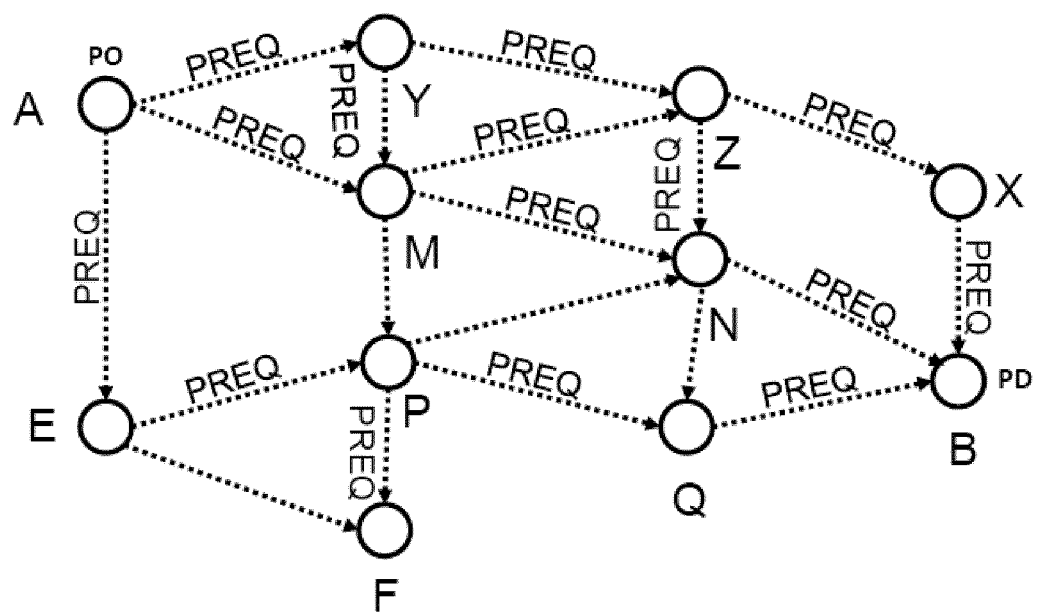
FIG. 2a shows the state of the art path request propagation procedure.
Figure 2B:
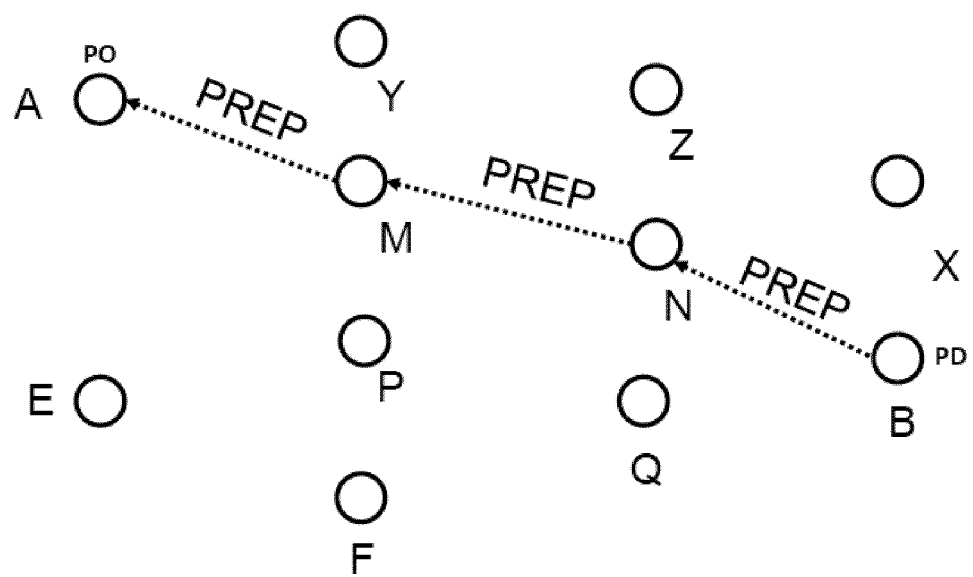
FIG. 2b shows the state of the art path creation procedure using PREP.
Figure 3:
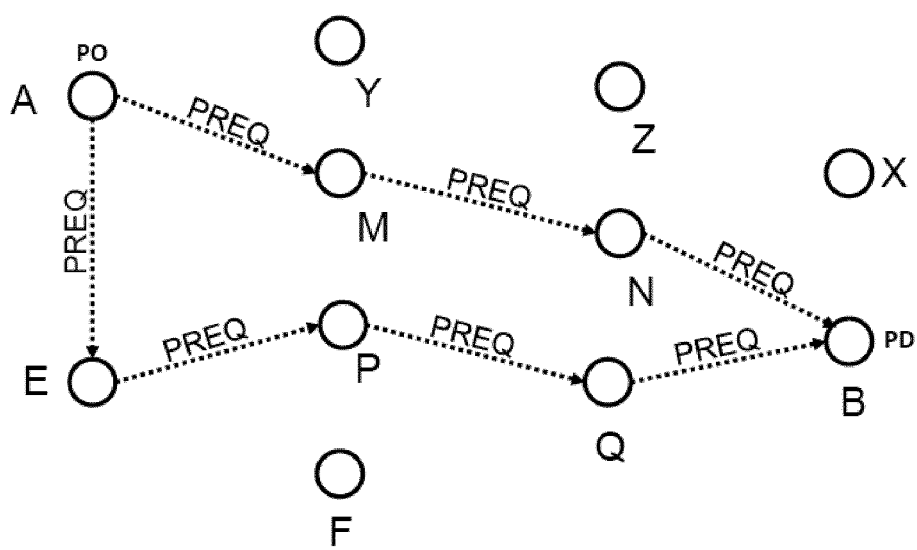
FIG. 3 shows the state of the art hop count-based path selection algorithm.
Figure 4:
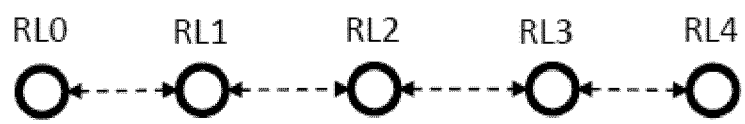
FIG. 4 shows a state of the art neighbour information propagation example.
Figure 5:
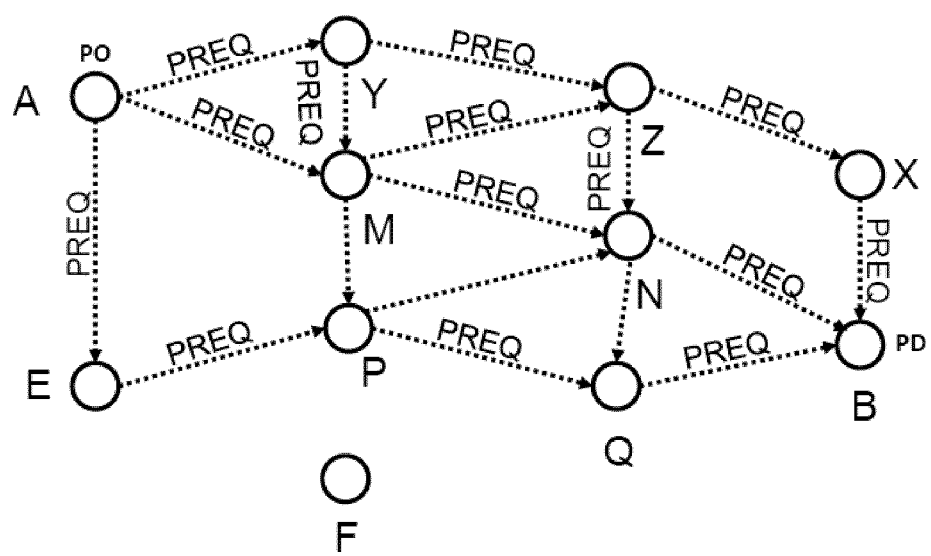
FIG. 5 shows a state of the art PREQ propagation during path discovery.

FIG. 5 illustrates a case when Node A, the PO in this case, wants to find a path to Node B, the PD in this case.

PREQ are propagated through the whole network to find node B. After node B has received the first PREQ it continues to receive additional PREQ during a certain period. In this example node B has received PREQ from node X, N and Q before the period has expired.

Figure 6:
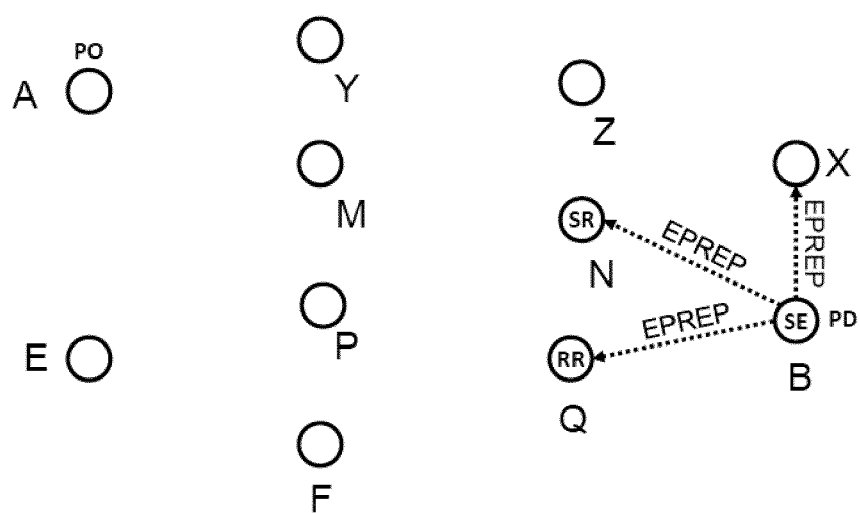
FIG. 6 shows EPREP message sent from the PD node.

FIG. 6 illustrates the immediate actions after PREQ timeout in node B, the PD.

The PD, Node B, will assign one selected relay node (SR) based on the applicable path creation algorithms. In BLE, there are, as explained before, two hop-count based path creation algorithms available. Which one to choose is outside the scope of this disclosure.

Node B could also assign one or more redundant relay nodes (RR). How to select redundant relay nodes are explained in more detail further below in this disclosure.

After assigning the selected relay node (SR), and possibly one or more redundant relay nodes (RR), the PD, node B, generates and sends an Extended Path Reply Message. Taking the current Bluetooth mesh specification as an example we introduce a new message in this disclosure (the EPREP message). While the PREP (standardised today) is a unicast message, the EPREP (which is a new message introduced in this Disclosure) is sent as a broadcast message.

The PD, node B, will act as Sender of the Extended Path Reply (SE), one should note that the SR and the one or more RR are assigned from the perspective of the SE, in this case the PD, Node B.

As shown in FIG. 6, node B has assigned node N as the selected relay node (SR) of the selected path and has also assigned node Q as the redundant relay node (RR) of the path. As a broadcast message, the EPREP is received by nodes N, Q and X.

When a node receives the EPREP it needs to find out whether it is a selected relay node (SR), a redundant relay node (RR), or none of the above.

The node is a selected relay node (SR) if the primary network address of the node matches the address of the selected relay node (the value of the SNA field) in the EPREP. The node is a redundant relay node if the redundant relay feature is enabled (the RNE bit is set) in the EPREP and if the primary network address of the node matches one of the addresses in the list of the redundant relay nodes (the RRA field) in the EPREP.

The node is neither a selected relay node or a redundant relay node if none of the conditions described are true.

Please also refer to the sections about message formats further below in this disclosure.

A node that has detected that it is a selected relay node (SR), node N in this example, processes this message in principle as a normal PREP. Node N inserts a new entry into its local forwarding table (FT) and generates a new EPREP, and further sends the new EPREP towards the path originator direction.

A node that has detected that it is a redundant relay node (RR), node Q in this example, also inserts a new entry into its local forwarding table (FT). However, as a redundant relay node (RR), node Q does not generate any further EPREP.

A node that has detected that it is a neither a selected relay node nor a redundant relay node (node X in this example), simply discards the received EPREP.

Figure 7:
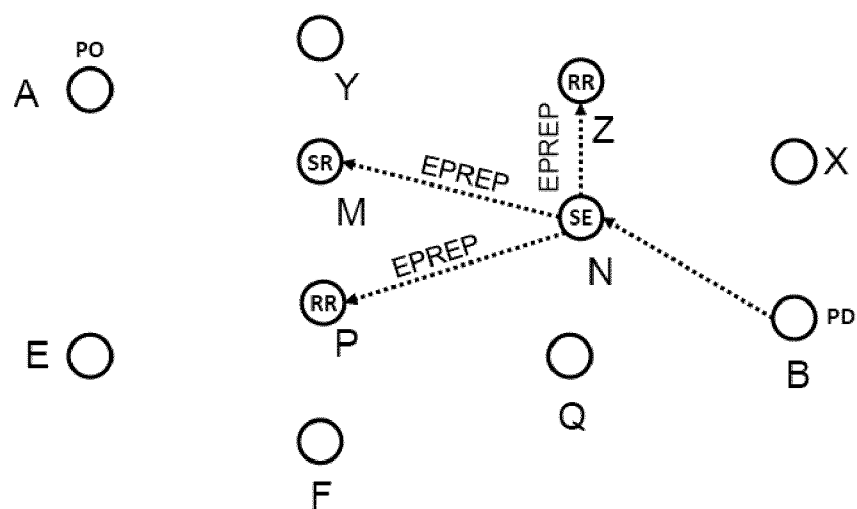
FIG. 7 shows EPREP relay selection and EPREP sending from node N.

FIG. 7, illustrates how Node N, now will act as Sender of the Extended Path Reply (SE), one should note that the SR and the one or more RR are assigned from the perspective of the SE, in this case node N.

As shown in FIG. 7, node N has assigned node M as the selected relay node (SR) of the path. Furthermore, node N has assigned, node P and node Z as the redundant relay nodes (RR). Nodes M, P and Z will, when receiving the EPREP from node N, act as described when discussing figure further 6 above.

FIG. 7 is somewhat simplified to easier convey the inventive idea. In this case, most likely, also nodes Q and B would receive the EPREP sent from node N, they would of course also have acted as described when discussing FIG. 6 further above.

The procedure of nodes receiving an EPREP and if determining that they are selected relay nodes will then be repeated until an EPREP reaches the PO, node A.

It shall be noted here, that, in some occasion there may only be a selected relay node available, whereas in other occasions there may in addition to the selected relay node be one or more redundant relay nodes available in the EPREP. This means that for a specific path, each node in the specific path determines how many, if any, redundant relay nodes should be assigned. A maximum number of redundant relay nodes could also be defined on a system level, hardcoded, at compile time or decided on when the system is up and running.

Figure 8:
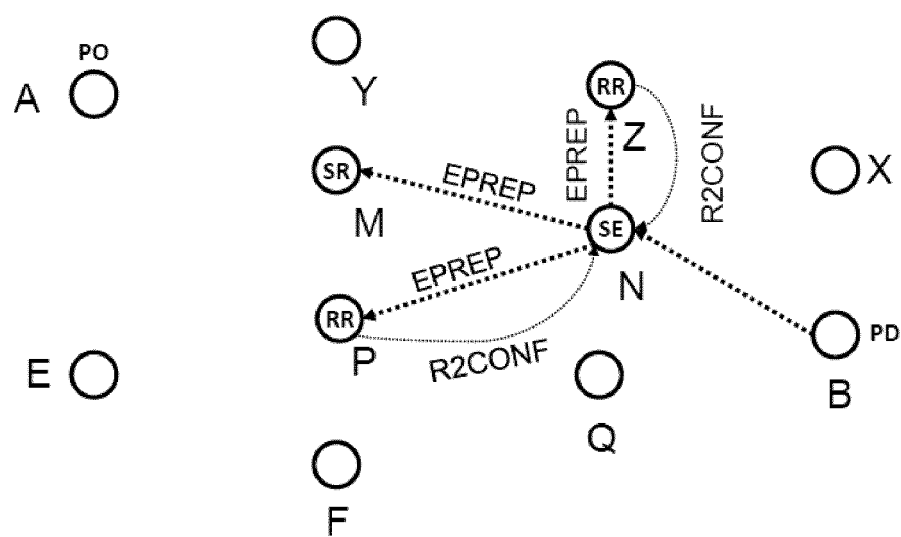
FIG. 8 shows the use of the Redundant relay node confirmation (R2CONF) message.

FIG. 8 describes an alternative embodiment introducing a notification, to the sender of an EPREP, whether an assigned redundant relay node accepts the role as redundant relay node.

When a node receives an EPREP and detects that is assigned as a redundant relay node, it responds to the sender of the EPREP with a notification message, also refer to as a redundant relay node confirmation message (R2CONF) that indicates whether it accepts the role as redundant relay node or not. R2CONF is a unicast message sent from the redundant relay node to the sender of the received EPREP (SE).

FIG. 8 shows how node Z and node P receives the EPREP, both nodes transmit a notification to the SE, node N, indicating whether or not they can act as redundant relay node for this path. The R2CONF is used by the EPREP sender as a redundant relay node acknowledgement message.

Figure 9:
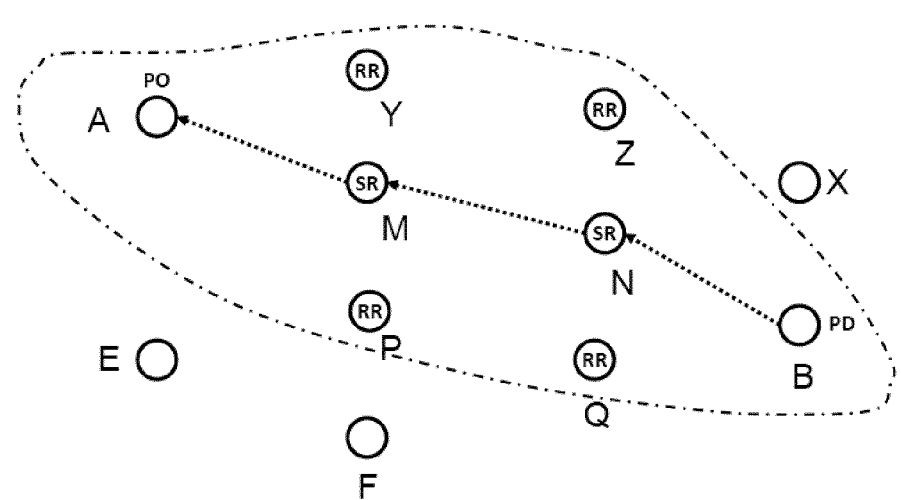
FIG. 9 shows Path and redundant relay node creation.

FIG. 9 shows the path that is created between node A and node B, as well as the redundant relay nodes.

Node A can reach node B (and node B can reach node A) via node M and node N in the created path, node M and N are selected relay nodes (SR).

Moreover, node P, node Q, node Y and node Z are assigned as redundant relay nodes (RR) which are close to the selected path between node A and node B. In FIG. 7 it is assumed that if the embodiment with notifications are used, the assigned redundant relay nodes has accepted the role as redundant relay nodes.

The redundant relay nodes (RR) will also relay application-messages thus providing redundancy in the system.

Selection of Redundant Relay Nodes

This section describes possible methods to find redundant relay nodes (RR) that could help the message forwarding for the selected relay nodes.

To efficiently increase the message forwarding success rate, a redundant relay node should have good link with both the EPREP sender and the designated EPREP receiver (the selected relay node). As shown in the FIG. 6, to better serve the message forwarding, node B assigns node Q as the redundant relay node, but not node X, since node X does not have a link to node N (as shown in FIG. 5). The assignment is achieved by utilizing the neighbour table information that is periodically broadcast from each relay node (as described in the background section). In this specific case, node B realizes that node X does not have a strong link to node N, which disqualifies node X as a redundant relay node.

Node B can receive the neighbour information from either node Q or node X or both nodes. When node B generates the EPREP, it checks the neighbour information of node Q and node X. since node X does not reporting node N as its neighbour, node B does not include node X as a redundant relay node, although node X could have a very good link with node B.

The number of maximums allowed redundant relay nodes (per path) for one given selected relay node can be controlled by defining a state in each relay node.

Message Formats

This section describes the proposed message formats for this proposal. Two message formats are defined. The EPREP can be regarded as a new message or as a redefined PREP (extended to facilitate the functionality described in this disclosure), and the R2CONF can be regarded as a new message, as compared with the current standard specification.

Extended Path Reply (EPREP) Format

The current PREP is defined to provide the selected relay node enough information to populate its local forwarding table. In general, it includes the path originator, path destination and path forwarding number information to uniquely identify an on-going path discovery procedure. It also includes additional information of the path destination, e.g., the address range information.

The EPREP is a broadcast message compared to the PREP which is a unicast message. The primary network address of the selected relay node is put into the message body of the EPREP. EPREP also extends the existing PREP by appending a list of primary network addresses of the redundant relay nodes.

An example of the proposed message format is shown in FIG. 10 (Table 1a) and FIG. 11 (Table 1b).

Compared with the current PREP format, two extra fields are added, SNA and RRA. SNA is a two-byte filed that indicate the primary network address of the selected relay node in the path. The RRA is an address list containing the primary network addresses of the redundant relay nodes for the path. Since there could be more than one address included in the RRA, the length of this field is a multiple of 2 bytes.

Furthermore, a new bit named RNE is defined by using one of the reserved for future use (RFU) bits from the previous PREP message. This is a bit Besides the fields above, the below should also be put into the generic header (not shown above) used for all messages.

The network src address of the EPREP shall be the primary network address of the message transmitter.

The network dst address of the EPREP message shall be set to the All Directed Forwarding Group Address.

The ttl of the EPREP message shall be set to 0, Indicating a one hop message in BLE.

The EPREP message is recommended to be sent multiple times to increase the probability to be received by the assigned selected relay nodes (SR) and assigned redundant relay nodes (RR). This handling might differ between the acknowledged mode, and the none acknowledged mode, discussed further below in this disclosure.

Redundant Relay Confirmation (R2CONF) Format

The purpose of sending a notification message, here referred to as Redundant Relay Confirmation (R2CONF), from a node that is assigned as a redundant relay node (RR), is to accept or reject the role as a redundant relay node. In case the EPREP message is accepted by the redundant relay node, the status of the R2CONF indicates Success (for example by using the value 0x00). Otherwise, the message can use different error codes to identify the reason.

FIG. 12 (Table 2) shows a possible message format for R2CONF.

Generally, the notification message should contain the information that could uniquely identify a path. This message should contain fields like PO, PD, OBOO and FN to uniquely identify a path.

Besides the fields above, the below should also be put into the generic header (not shown above) used for all messages.

The network src field of the R2CONF shall be the primary network address of the R2CONF transmitter.

The network dst field of the R2CONF shall be the primary network address of the received EPREP message transmitter.

The ttl of the R2CONF shall be 0, Indicating a one hop message in BLE.

Flow Charts

Message sequence charts are described from both EPREP transmitter and EPREP receiver's perspective. The EPREP message initialization procedure is triggered by the path destination PD device.

The message sequence charts are depicted in two major embodiments, non-acknowledged mode and acknowledged mode.

In the non-acknowledged mode, only EPREP message is used to assign redundant relay nodes.

In the acknowledged mode, both EPREP and R2CONF are used so that redundant relay node status is acknowledged. The acknowledged mode is also described in more details further above in this disclosure.

Non-Acknowledged Mode

Figure 13:
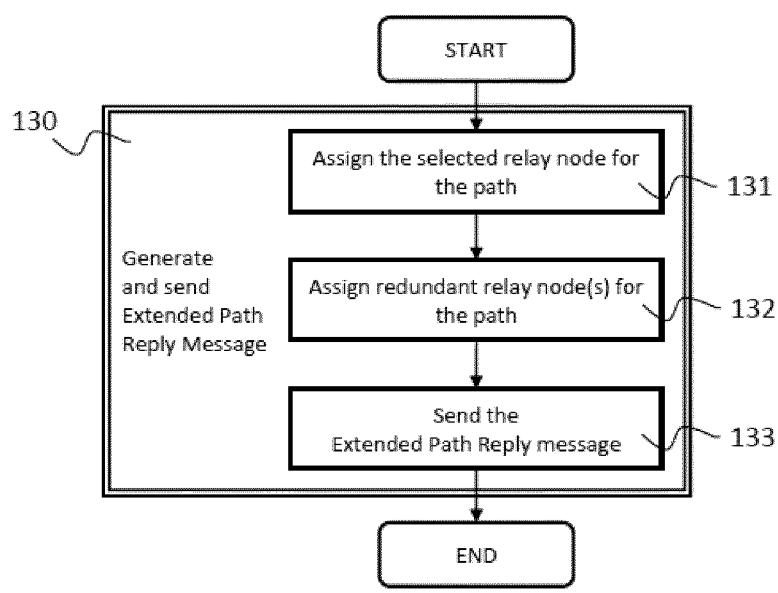
FIG. 13 is a flow chart for the EPREP initiator in non-acknowledged mode.

FIG. 13 shows the flow chart for the EPREP initialization procedure by the PD Device in non-acknowledged mode After having received one or more PREQ, during a time period after receiving the first PREQ, the PD generates and sends 130 the extended path reply message. The generation and sending are performed by a method comprising:

assigning 131 the selected relay node (SR) for the path; and assigning 132 the one or more redundant relay nodes (RR) for the path; and sending 133 an Extended Path Reply Message (EPREP), comprising the address of the assigned selected relay node (SR) and the address of the one or more assigned redundant relay nodes (RR) as a broadcast message.

The PD device decide the selected relay node for the path. Secondly, based on this address, it checks its local neighbour table information and search for neighbours that are both the neighbour of the selected relay node and itself. Finally, this information is used to construct the EPREP message.

For example, in the example as shown in FIG. 9, PD device node B needs to send an EPREP message. Based on the discovery table information, node N is selected as the relay node in the path. Meanwhile, node B starts looking for its neighbour nodes that are also the neighbour of node N. In this case, node Q fulfils this criterion. As a result, in the generated EPREP message, SNA is assigned with the network address of node N and RRA only contain one address, which is the network address of node Q.

The EPREP message is recommended to be sent multiple times to increase the probability to be received by both node N and node Q.

Figure 14:
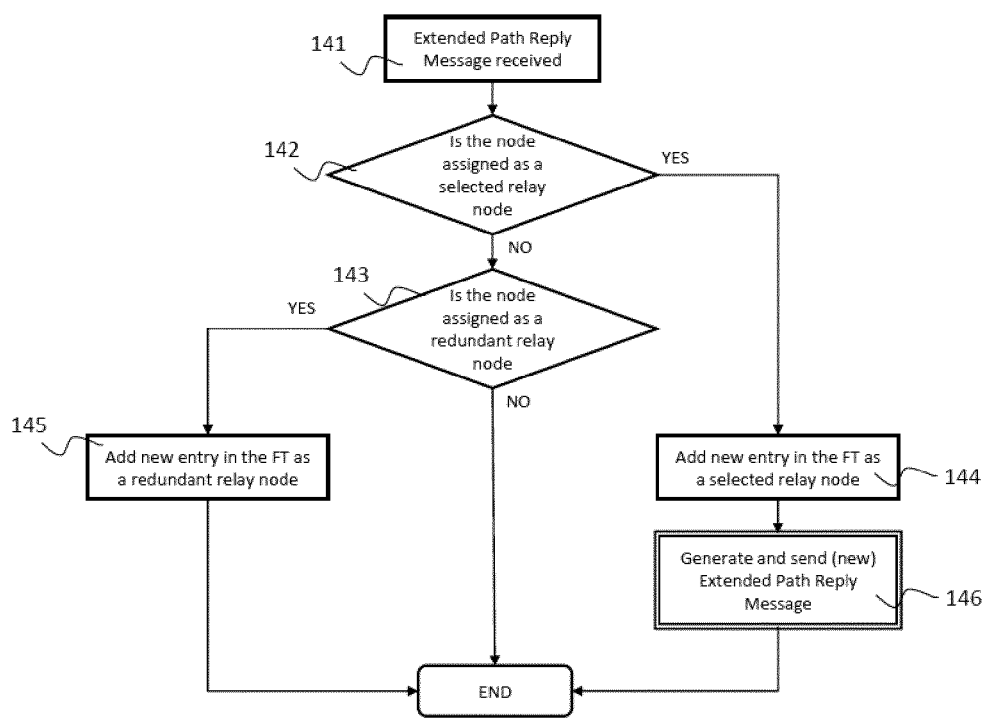
FIG. 14 is a flow chart for an EPREP receiver in non-acknowledged mode.

FIG. 14 shows the flow chart for the EPREP message receiver in non-acknowledged mode.

When an EPREP is received 141 by a node, it determines whether it is assigned as a selected relay node 142, by trying to match its local primary network address with SNA. If the above is not the case it tries to determine whether it is assigned as a redundant relay node 143, by trying match its local primary network address with any of the addressed in the RRA (provided that the redundant relay feature is enabled, the RNE bit is set, in the EPRET).

If the receiving node is the selected relay node for the path, it adds a new entry 144 in the local forwarding table and generates and sends 146 a new EPREP.

If the receiving node is assigned as a redundant relay node it adds a new entry 145 in the local forwarding table. (In this case it will not prepare and send a new EPREP.)

If the receiving node network address determines that is neither assigned as a selected relay node or a redundant relay node the received message is discarded.

Acknowledged Mode

In the acknowledgement mode, redundant relay nodes send a notification message (R2CONF) to the sender of the EPREP (SE). The status fields of the R2CONF indicate if the redundant relay node request is accepted or not. If the R2CONF is missing or indicate a negative status, the EPREP message sender can alternatively send the updated ERPEP message to other redundant relay node candidates.

Figure 15:
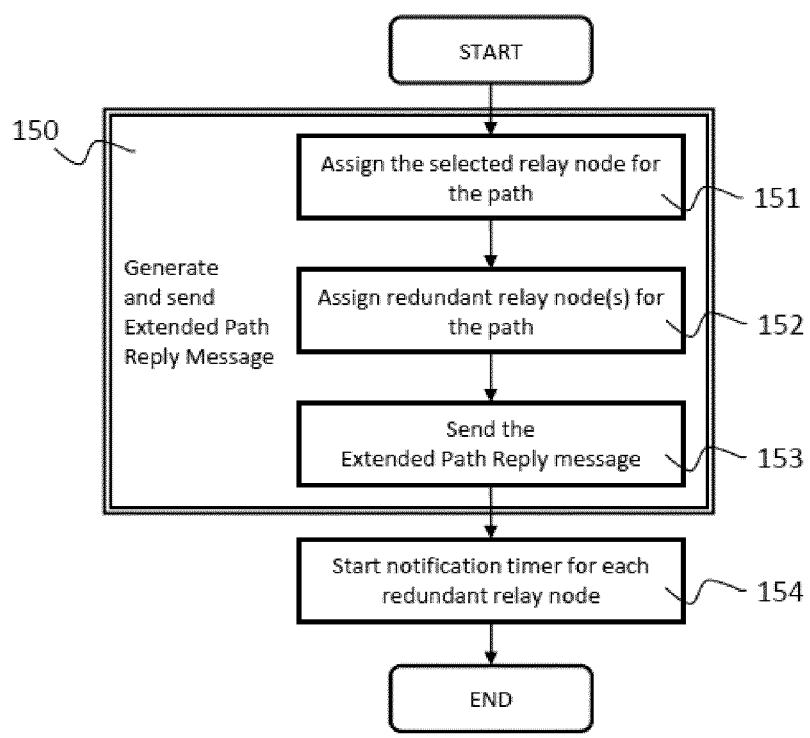
FIG. 15 is a flow chart for the EPREP initiator in acknowledged mode.

FIG. 15 shows the flow chart for the EPREP initialization procedure by the PD Device in acknowledged mode The EPREP message procedure in acknowledged mode is similar as in the non-acknowledgement mode. The only different is that, after EPREP is sent, a Redundant Node Wait Timer (R2CONF wait time) is started 154 for each node in the RRA list. The purpose of this timer is to keep track of the expected R2CONF time before resending the message or the redundant relay node request is considered failed.

In acknowledged mode, after having received one or more PREQ, during a time period after receiving the first PREQ, the PD generates and sends the extended path reply 150 and starts a notification timer for each assigned redundant relay node 154. This is performed by a method comprising:

assigning 151 the selected relay node (SR) for the path; and assigning 152 the one or more redundant relay nodes (RR) for the path; and sending an Extended Path Reply Message (EPREP) 153, comprising the address of the assigned selected relay node (SR) and the address of the one or more assigned redundant relay nodes (RR) as a broadcast message; and starting a timer 154 for each redundant relay node.

Figure 16:
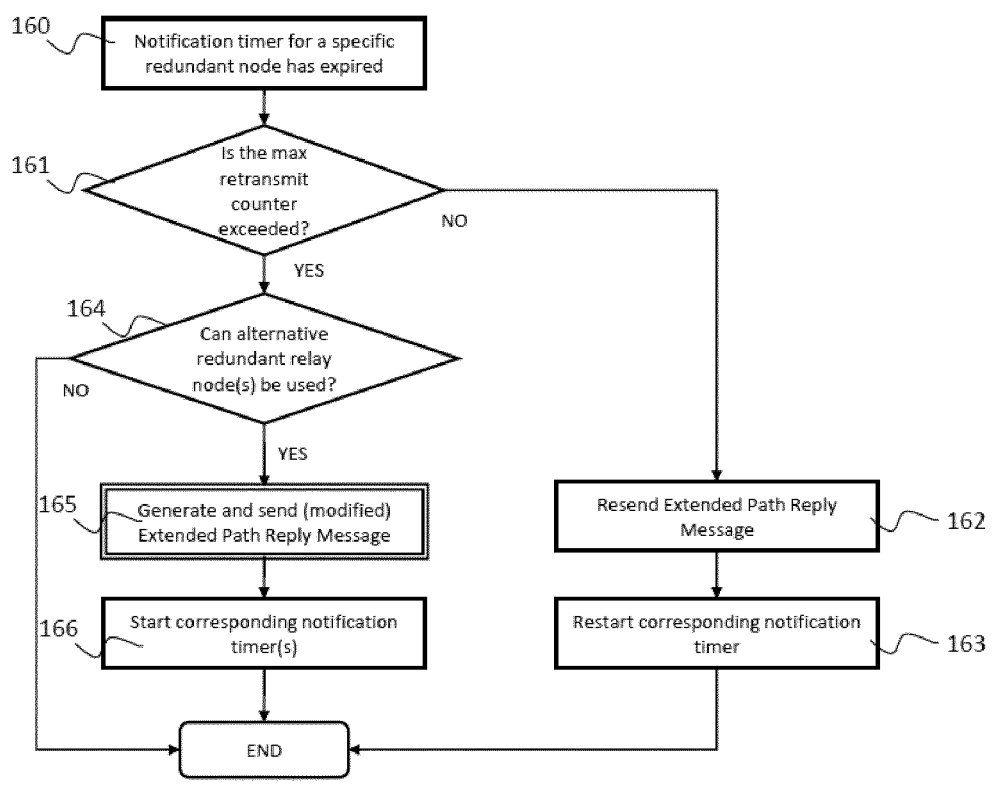
FIG. 16 is a flow chart for how an EPREP sender handles a notification timer expiration.

FIG. 16 depicts the EPREP message retransmission procedure.

When a notification timer fires 160, the EPREP sender considers that the redundant relay node did not receive the EPREP message.

The node might proceed according to some alternative methods, depending on a max a transmit counter is utilised and whether the node can use alternative redundant relay nodes. The different methods can be read on selected parts of FIG. 16.

If no retransmit counter is used and alternative relay nodes can't be used, the node will de-assign the assigned redundant relay node.

If a retransmit counter is used, but alternative relay nodes can't be used, the node will determine if the max transmit counter has been exceeded 161, meaning that the max number of retransmissions has been made.

If the max retransmit counter has been exceeded the node will de-assign the assigned redundant relay node.

If the max retransmit counter has not been exceeded, the node will resend the EPREP 162 and restart the corresponding timer 163.

If a retransmit counter is used, and alternative relay nodes can be used, the node will determine if the max transmit counter has been exceeded, meaning that the max number of retransmissions has been made.

If the max retransmit counter has been exceeded the node will determine whether alternative redundant nodes can be used 164 (determining the availability of alternative redundant nodes).

If alternative redundant nodes can be used, the node will de-assign the assigned redundant relay node, assign one or more alternative redundant relay nodes and generate and send a modified EPREP 165 where the addresses of the alternative redundant relay nodes will be present but the address of the de-assigned redundant relay node will not be present, finally the node will start the corresponding notification timers 166.

If alternative redundant nodes can't be used, the node the node will de-assign the assigned redundant relay node.

If the max retransmit counter has not been exceeded, the node will resend the EPREP 162 and restart the corresponding timer 163.

If a retransmit counter is not used, but alternative relay nodes can be used (alternative redundant nodes are available), the node will de-assign the assigned redundant relay node, assign one or more alternative redundant relay nodes and generate and send a modified EPREP where the addresses of the alternative redundant relay nodes will be present but the address of the de-assigned redundant relay node will not be present, finally the node will start the corresponding notification timers.

If alternative redundant nodes can't be used, the node the node will de-assign the assigned redundant relay node.

Figure 17:
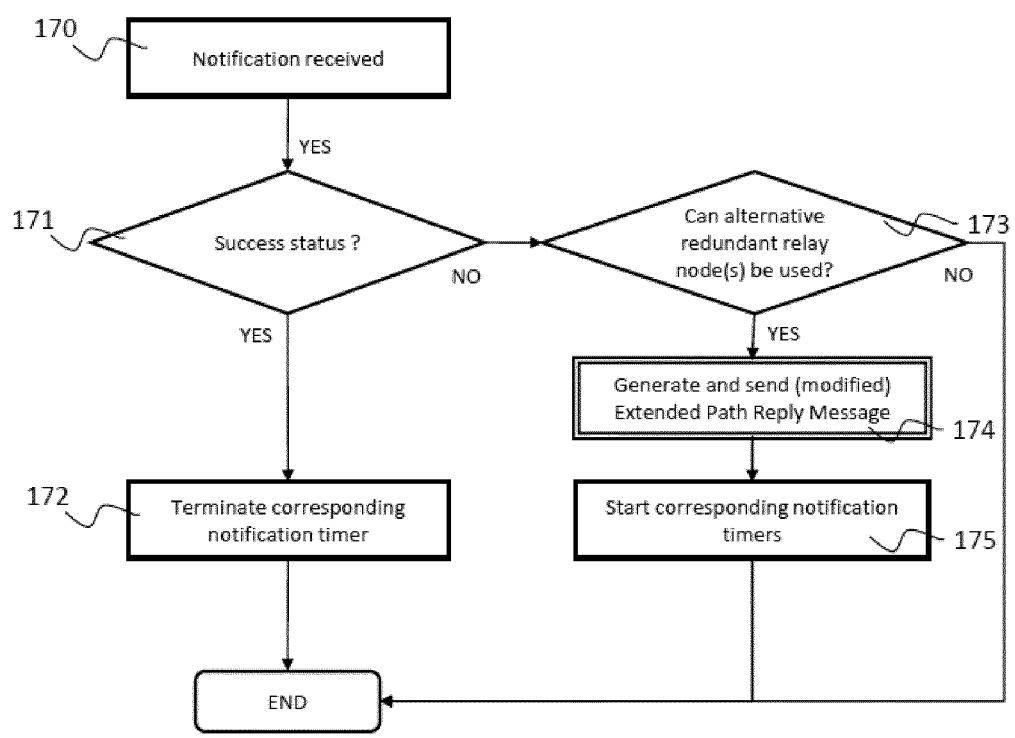
FIG. 17 is a flow chart for the procedure that the EPREP sender handles received R2CONF.

FIG. 17 depicts the R2CONF handling procedure of the EPREP message sender.

(Not shown in FIG. 17, and not central to the invention, but relevant for Bluetooth mesh, when a notification message (R2CONF), the message status is checked. If the status indicates that the node that sent the R2CONF does not have a valid entry in the discovery table, the node shall be considered invalid and shall not be retransmitted with any EPREP message for this path. This might be due to that the retransmit procedure have been so long so that the entry in the discovery table expired.)

Otherwise, the sending node (SE), sender of the EPREP, determines if the status of the notification message (R2CONF) indicates success 171.

If this is the case the SE knows that the sender of the R2CONF has accepted its role as a redundant relay node, the SE will now terminate the corresponding notification timer 172.

If the status of the notification message (R2CONF) does not indicate success, it means the node that was assigned as a redundant relay node has received the EPREP message but has not accepted to take the role as a redundant relay node for this path. The SE will de-assign the assigned redundant relay node.

In this case the SE might also assign one or more alternative redundant relay node candidates and send an updated EPREP 174 comprising the addresses for the one or more alternative redundant relay nodes, but not the address for the de-assigned redundant relay node. The SE will also start the corresponding notification timers 175.

Figure 18:
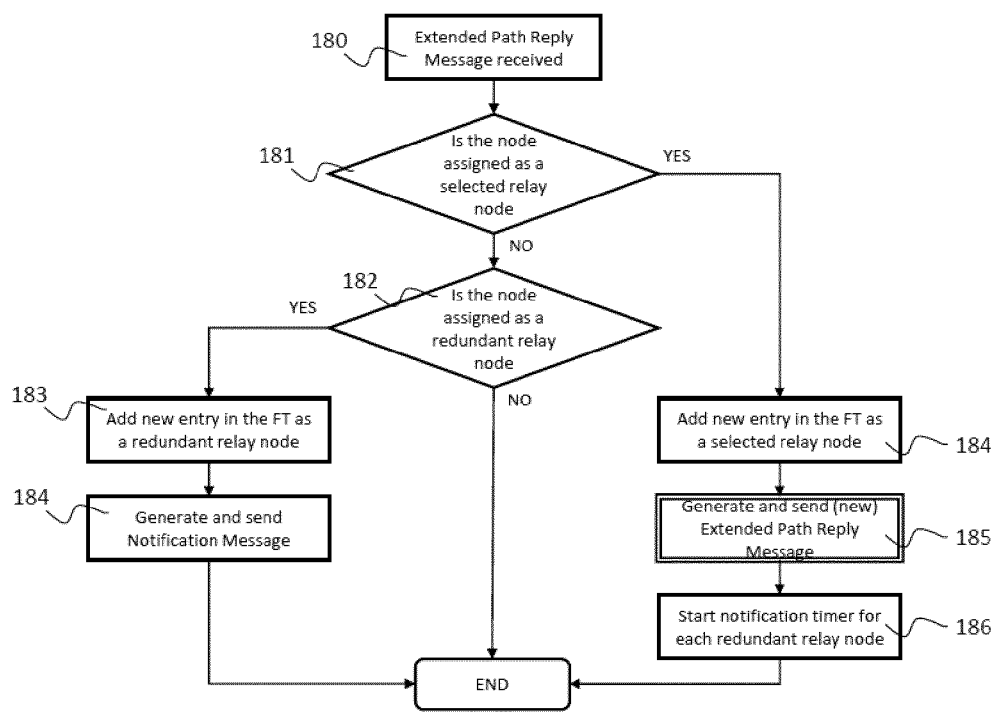
FIG. 18 is a flow chart for an EPREP receiver in acknowledged mode.

FIG. 18 shows the flow chart for the EPREP message receiver in acknowledged mode.

When an EPREP message is received 180, the receiving node acts as in the corresponding situation in the non-acknowledged mode, with some minor differences.

When an EPREP is received by a node 180, it determines 181 whether it is assigned as a selected relay node, by trying to match its local primary network address with SNA. If the above is not the case it tries to determine 182 whether it is assigned as a redundant relay node, by trying match its local primary network address with any of the addressed in the RRA (provided that the redundant relay feature is enabled, the RNE bit is set, in the EPRET).

If the receiving node is the selected relay node for the path, it adds a new entry in the local forwarding table (FT) 184 (indicating that it is a selected relay node) and generates and sends a new EPREP 185. Here it also starts notification timers 186 for the assigned redundant relay nodes.

If the receiving node is assigned as a redundant relay node it should determine whether it accepts the role of redundant relay node. If it accepts the role it shall add a new entry in the local forwarding table (FT) 183 (indicating that it is a redundant relay node) and generate and send a notification message (R2CONF) indicating success 184. If it does not accept the role it shall generate and send a notification message indicating non-success (according to a choice of available codes). (Regardless of whether the node accepts the role or not it shall not generate and send a new EPREP.)

If the receiving node network address determines that is neither assigned as a selected relay node or a redundant relay node the received message is discarded.

Forwarding Table Creation and Maintenance for Redundant Relay Node

While forwarding entries in the selected relay nodes need to be maintained, the forwarding table entries for redundant relay node does not needs to be maintained, e.g., using tracing mode. The following special rules applies to the forwarding table entries of a redundant relay node.

Figure 19:
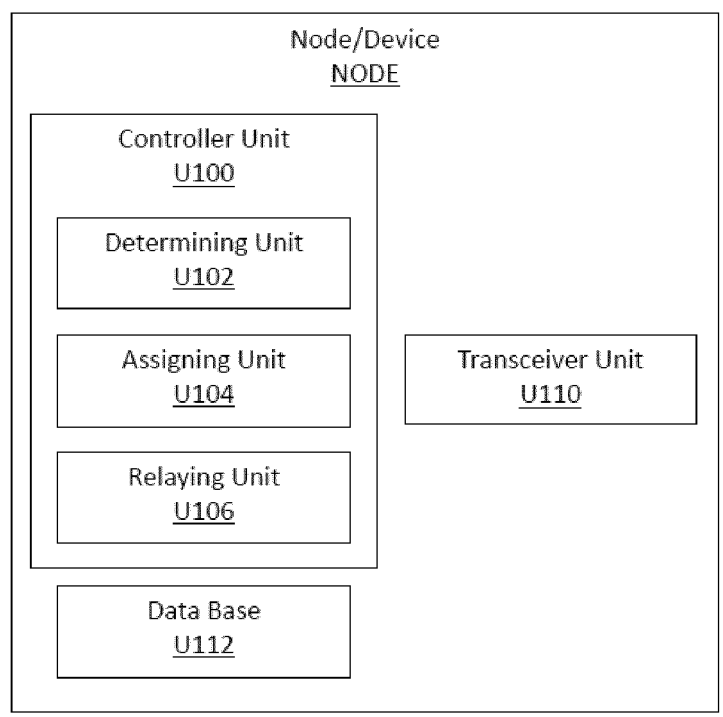
FIG. 19 is a schematic block diagram illustrating embodiments of a node/device.

1. Both redundant relay node entry and selected relay node entry may be saved in the same forwarding table. A redundant relay node forwarding table entry can be differentiated from a relay node entry in the forwarding table. E.g., if a Node to Originator and Node to Destination address is set to unassigned address, an entry is considered as a redundant relay node entry.
2. The redundant relay entry in a forwarding table is removed under the following circumstance.
   a. A Path error is received indicating the path that they are served for are being teared down.
   b. No message has been forwarded and the entry is aged due to the life time of the entry expired.
3. Once the redundant relay node receives the path Error message, it might help to forward the received path error message FIG. 19 is a schematic block diagram illustrating embodiments of a node/device.

The device/node (NODE) comprises various units.

A controller unit (U100) further comprising, a determining unit (U102), an assigning unit (U104) and a relaying unit (U106), where the controller unit (U100) is (and/or the comprised units are) configured to make determinations, assignments and relaying messages, according to the various embodiments described in this specification.

A data base (U112) (a storage unit) for permanently or temporarily storing different information according to the various embodiments described in this application.

A transceiver unit (U110) that is configured to transmit (send) and receive the various messages according to the various embodiments described in this application.

The blocks in the block diagram, may refer to a combination of analog and digital circuits, and/or one or more controller units, configured with software and/or firmware, e.g. stored in the storage units (data base), that when executed by the one or more controller units perform as described above. One or more of these controller units, as well as any other combination of analog and digital circuits, may be included in a single application-specific integrated circuitry (ASIC), or several controller units and various digital hardware may be distributed among several separate components, whether individually packaged or assembled into a system-on-a-chip (SoC). The one or more controller units may be any one of, or a combination of a central processing unit (CPU), graphical processing unit (GPU), programmable logic array (PAL) or any other similar type of circuit or logical arrangement.

Figure 20:
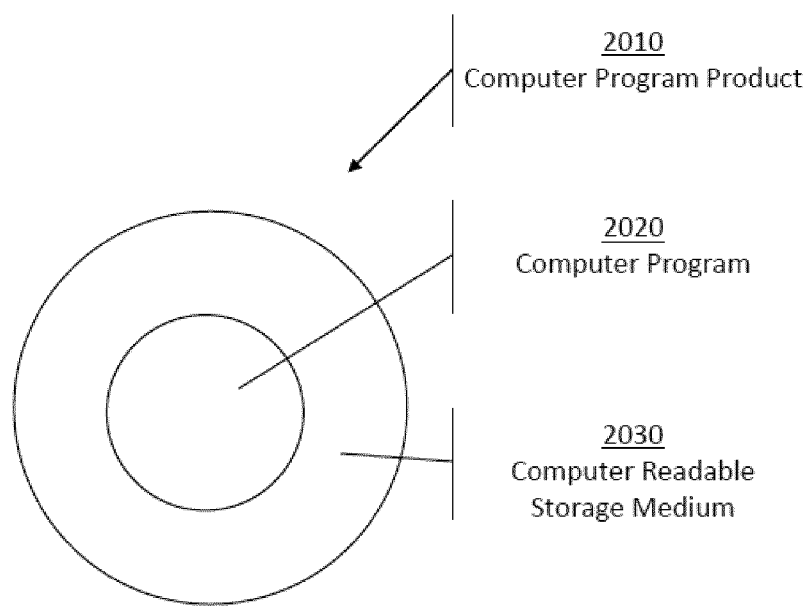
FIG. 20 shows one example of a computer program product.

FIG. 20 shows one example of a computer program product.

The computer program product (2010) comprising a computer program (2020), and a computer readable storage medium (2030) on which the computer program is stored, where the computer program when run on the relaying device causes the relaying device to execute any, or all, of the various embodiments herein.

The embodiments herein may be implemented through combination of analog and digital circuits, and one or more controller units, together with computer program code for performing the functions and actions of the embodiments herein. The program code mentioned above may also be provided as a computer program product, for instance in the form of a data carrier carrying computer program code for performing the embodiments herein when being loaded into the mobile communications device. One such carrier may be in the form of a CD ROM disc. It is however feasible with other data carriers such as a memory stick. The computer program code may furthermore be provided as pure program code on a server and downloaded to the mobile communications device at production, and/or during software updates.

When using the word "comprise" or "comprising" it shall be interpreted as non-limiting, i.e. meaning "consist at least of".

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method, being performed by a sender of an extended path reply (EPREP) message, for setting up a path with one or more selected relaying nodes and one or more redundant relaying nodes from a path originator to a path destination, where the path originator, the one or more selected relaying nodes, the one or more redundant relaying nodes and path destination participate in a mesh network, the method comprising:
assign a selected relay node for the path;
assign one or more redundant relay nodes for the path;
generate an EPREP message, wherein the EPREP message is a path reply (PREP) message that further comprises an address of each of the one or more redundant relaying nodes; and
send the EPREP message as a broadcast message.

2. The method according to claim 1, where assigning the redundant relay is based on determining that the redundant relay node must have links to both the sender of the EPREP Message and the selected relay node.

3. The method according to claim 2, where the determining is based on obtaining neighbour table information from either the selected relay node, the redundant relay node or both.

4. The method according to claim 1, further comprising: starting a notification timer for each redundant relay node.

5. A method, being performed by a receiver of an extended path reply (EPREP) message, for setting up a path with one or more selected relaying nodes and one or more redundant relaying nodes from a path originator to a path destination, where the path originator, the one or more selected relaying nodes, the one or more redundant relaying nodes and path destination participate in a mesh network, the method comprising:
receive an EPREP message, wherein the EPREP message is a path reply (PREP) message that further comprises an address of each of the one or more redundant relaying nodes;
determine from the EPREP message whether the receiver of the EPREP message is assigned as a redundant relay node; and
when the receiver of the EPREP message is assigned as a redundant relay node, add a new entry, as a redundant relay node, in a local forwarding table.

6. The method according to claim 5, further comprising; generating and sending a notification message to the sender of the EPREP message.

7. A device for setting up a path with one or more selected relaying nodes and one or more redundant relaying nodes from a path originator to a path destination, where the path originator, the one or more selected relaying nodes, the one or more redundant relaying nodes and path destination participate in a mesh network, the device comprising one or both of circuitry and one or more controllers that are configured to cause the device to perform:
assigning a selected relay node for the path, and assigning one or more redundant relay nodes for the path;
generating an extended path reply (EPREP) message, wherein the EPREP message is a path reply (PREP) message that further comprises an address of each of the one or more redundant relaying nodes; and
sending the EPREP message as a broadcast message.

8. The device according to claim 7, wherein assigning the one or more redundant relay nodes is based on determining that the redundant relay node must have links to both the sender of the EPREP Message and the selected relay node.

9. The device according to claim 8, wherein the one or both of circuitry and one or more controllers are further configured to cause the device to perform obtaining neighbour table information from either the selected relay node, the redundant relay node or both.

10. The device according to claim 7, wherein the one or both of circuitry and one or more controllers are further configured to cause the device to perform:
starting a notification timer for each redundant relay node.

11. A device for setting up a path with one or more selected relaying nodes and one or more redundant relaying nodes from a path originator to a path destination, where the path originator, the one or more selected relaying nodes, the one or more redundant relaying nodes and path destination participate in a mesh network, the device comprising:
a transceiver configured to receive an extended path reply (EPREP) message, wherein the EPREP message is a path reply (PREP) message that further comprises an address of each of the one or more redundant relaying nodes;
one or both of circuitry and one or more controllers configured to cause the device to perform:
determining from the EPREP message whether the receiver of the EPREP message is assigned as a redundant relay node; and
when the receiver of the EPREP message is assigned as a redundant relay node, adding a new entry, as a redundant relay node, in a local forwarding table.

12. The device according to claim 11, further comprising the transceiver being configured to send a notification message to the sender of the EPREP message.

13. A non-transitory computer readable storage medium having stored therein a computer program which, when executed on a processor of a device, causes the device to perform a method for setting up a path with one or more selected relaying nodes and one or more redundant relaying nodes from a path originator to a path destination, where the path originator, the one or more selected relaying nodes, the one or more redundant relaying nodes and path destination participate in a mesh network, the method comprising:
  assign a selected relay node for the path;
  assign one or more redundant relay nodes for the path;
  generate an extended path reply (EPREP) message, wherein the EPREP message is a path reply (PREP) message that further comprises an address of each of the one or more redundant relaying nodes; and
  send the EPREP message as a broadcast message.

14. A non-transitory computer readable storage medium comprising a computer program which, when executed on a processor of a device causes the device to perform a method for setting up a path with one or more selected relaying nodes and one or more redundant relaying nodes from a path originator to a path destination, where the path originator, the one or more selected relaying nodes, the one or more redundant relaying nodes and path destination participate in a mesh network, the method comprising:
  receive an extended path reply (EPREP) message, wherein the EPREP message is a path reply (PREP) message that further comprises an address of each of the one or more redundant relaying nodes;
  determine from the EPREP message whether the receiver of the EPREP message is assigned as a redundant relay node; and
  when the receiver of the EPREP message is assigned as a redundant relay node, add a new entry, as a redundant relay node, in a local forwarding table.

* * * * *